US005198292A

United States Patent [19]

Lerner et al.

[11] Patent Number: 5,198,292

[45] Date of Patent: Mar. 30, 1993

[54] TACK CLOTH FOR REMOVING SOLID PARTICLES FROM SOLID SURFACES AND METHOD FOR ITS MANUFACTURE

[75] Inventors: Peter Lerner, North Attleboro, Mass.; Dennis Metrick, Cumberland, R.I.

[73] Assignee: International Paper Company, Purchase, N.Y.

[21] Appl. No.: 880,762

[22] Filed: May 8, 1992

Related U.S. Application Data

[63] Continuation-in-part of Ser. No. 560,477, Jul. 27, 1990, which is a continuation of Ser. No. 184,991, Jun. 15, 1988, abandoned.

[51] Int. Cl.[5] .............................................. B32B 27/00

[52] U.S. Cl. ................................ 428/290; 15/104.93; 15/204.1; 427/208.4; 427/389.9; 428/253; 428/254; 428/261; 428/264; 428/265; 428/267; 428/343; 428/348; 428/349; 428/355

[58] Field of Search ............... 428/254, 261, 290, 348, 428/349, 355, 253, 343, 264, 265, 267; 427/208.4, 389.9; 15/209.1, 104.93

[56] References Cited

U.S. PATENT DOCUMENTS

| | | | |
|---|---|---|---|
| 3,016,555 | 1/1962 | Penoyer | 15/209 |
| 3,208,093 | 9/1965 | Hansen | 15/506 |
| 3,537,945 | 1/1967 | Summers | 161/57 |
| 3,658,578 | 4/1972 | Bennett | 15/209.1 |
| 3,780,392 | 12/1973 | Lester | 15/104.93 |
| 4,510,640 | 4/1985 | Omori | 15/104 |
| 4,630,603 | 12/1986 | Greenway | 128/156 |

*Primary Examiner*—James J. Bell
*Attorney, Agent, or Firm*—Ostrager, Chong & Flaherty

[57] ABSTRACT

A cleaning cloth is formed by treating a fibrous material with a composition to which solid particles adhere. The composition includes a tackifier, a pressure-sensitive adhesive and a slip agent. The tackifier is 45–77 wt. %, the pressure-sensitive adhesive is 20–40 wt. % and the slip agent is 3–15 wt. % of the composition. Other ingredients, such an antifoam agent and a pH control, can also be added. The tackifier is an unsaturated, low-molecular-weight resin having low vapor pressure and a molecular weight of <30,000, e.g., polybutene, polyisobutylene, polyhexene or an unsaturated alkyl. The preferred tackifier is polybutene. The pressure-sensitive adhesive is acrylic, styrene butadiene rubber, vinyl acetate or other suitable pressure-sensitive compounds. The slip agent is a high-melting-point wax or a natural fatty acid ester. The preferred slip agent is ammonium stearate. The cleaning cloth is formed by applying a water-based emulsion of a mixture of a tackifier, a pressure-sensitive adhesive and a slip agent to the untreated cloth. The tackifier, adhesive and slip agent form a continuous coating on the fibers of the cloth.

23 Claims, 3 Drawing Sheets

TACK CLOTH FOR REMOVING SOLID PARTICLES FROM SOLID SURFACES AND METHOD FOR ITS MANUFACTURE

RELATED APPLICATION

This application is a continuation-in-part of pending U.S. patent application Ser. No. 07/560,477 filed on Jul. 27, 1990 is now pending and entitled "NONWOVEN CLEANING CLOTH", which in turn is a continuation of U.S. patent application Ser. No. 07/184,991 filed on Jun. 15, 1988, now abandoned.

FIELD OF THE INVENTION

The invention generally relates to cleaning cloths treated with cleaning agents. In particular, the invention relates to cleaning cloths treated with a composition that picks up solid particles from a solid surface when wiped thereover.

BACKGROUND OF THE INVENTION

The invention relates to cleaning cloths of the non-woven, woven or knitted types containing an adhesive and a tackifier which are effective to remove dust from a wide variety of surfaces. The cleaning cloths of this invention, for example, have been found to be highly effective in removing metallic particles produced by sanding automobile parts and body components in preparation for the painting of such parts and components.

Cleaning cloths of natural and synthetic fibers have been in use for many years. Without the addition of cleaning agents, their use is limited to simple cleaning tasks, often as an adjunct to the use of cleaning liquids and sprays in household use.

Non-woven cloths are particularly useful as cleaning cloths. In particular, non-woven cloths made by the hydro-entanglement process are highly effective for this use. The hydro-entanglement process is well-described in U.S. Pat. No. 3,537,945. Essentially, hydroentanglement process involves treating a web of fibers with jets cf high pressure water or other liquid which serves to "entangle" the fibers, i.e., to force the fibers from a position of alignment into one where the fibers individually are at various angles with respect to each other and become physically entangled to produce a hydroentangled fabric. The hydro-entangled fabric is exceptionally strong and soft, and it also contains voids which occur between the physical junctions of the fibers which are highly effective in assisting the pick-up and retention of dust and particles. Moreover, the hydro-entanglement process can be adjusted to produce a hydroentangled fabric which has visible apertures which also enhance dust and particle pick-up and retention.

The parent application Ser. No. 07/560,477, assigned to the assignee of the present application, discloses an invention which employs a hydroentangled fabric which is preferably (but not necessarily) of the aperture type, and which is preferably (but not necessarily) made of natural fibers, preferably from cellulosic fibers or other fibers. Further, the process of that invention involves impregnating the hydroentangled fibers with a pressure-sensitive adhesive and a tackifier while the hydroentangled fabric is still wet from the hydroentanglement process so that the pressure-sensitive adhesive and tackifier migrate completely throughout the hydroentangled fabric, as opposed to simply being applied on and remaining on the surface of the cloth.

U.S. Pat. No. 3,780,392 is directed to a dust cloth with a bioactive ingredient intended primarily for use in hospital and other places where bacteria, etc., are present and must be removed. In this patent, it is stated that the "tackifier is a pressure-sensitive adhesive"—which reflects the occasional confusion in the art between adhesives and tackifiers. More properly, adhesives, including pressure-sensitive adhesives, are one class of compounds and tackifiers are another class of compounds used to enhance the effectiveness of the adhesive. In the case of the invention of parent application Ser. No. 07/560,477, the tackifier increases the coefficient of friction and increases the ability of the pressure-sensitive adhesives to attract and retain dust and particles, especially metallic particles.

Thus, the '392 patent does not have a tackifier separate from a pressure-sensitive adhesive The "tackifier" [sic] disclosed is a "vinyl [sic] acetate copolymerized with a high molecular acrylic. A specific example of such a tackifier is 2-ethyl hexyl acrylate."

The '392 patent does not disclose the use of a wet cloth and thus requires surfactants and defoamers to wet the cloth which permits the cloth to take an even coating. The '392 patent also discloses the use of a lubricant for preventing the "tackifier" from adhering to a surface to which it is applied.

The concept of impregnating rags, as opposed to cloth, appears in U.S. Pat. No. 3,016,555, which discloses yet another chemical system involving a certain class of polyester resins dissolved in a plasticizer, the combination of which is referred to as a "tackifier". This patent does not disclose the use of both a pressure-sensitive adhesive and a tackifier.

Another reference involving impregnating cloths is U.S. Pat. No. 3,208,093, which discloses a tack cloth coated with synthetic resin conditioned with plasticizers and other modifiers so that the resin is not sticky to the touch and will not transfer to the surface being wiped. The "tackifier" ingredients are dispersible in an aqueous vehicle, e.g., an emulsion. The "tackifiers" disclosed include polyvinyl acetate, acrylic polymer, polystyrene and butadiene-styrene. The plasticizers are selected from phosphate and phthalate plasticizers.

Finally, U.S. Pat. No. 4,510,640 discloses a duster made of plastic film, one face being coated with a pressure-sensitive adhesive to afford a dust catching ability.

By contrast, the invention of parent application Ser. No. 07/560,477, as indicated, involves applying the pressure-sensitive adhesive and tackifier to the hydroentangled fabric while wet, so that the pressure-sensitive adhesive and tackifier can thoroughly impregnate the hydroentangled fabric. The result is a fabric which has a good hand, is soft and has excellent particle pick-up and does not leave chemical residue, nor does it stick to the surface to be cleaned. The invention of parent application Ser. No. 07/560,477 is very effective in picking up dust and metal particles and retaining them. This pick-up of dust and metal particles is achieved while the cloth is passed smoothly and quickly across a wide variety of surfaces, including metal surfaces. It was believed that the use of a tackifier greatly enhanced the particle pick-up capability of the pressure-sensitive adhesive and, further, that the thorough impregnation of the pressure-sensitive adhesive and the tackifier greatly enhanced particle retention. Probably, this occurs because the fibers in the hydroentangled fabric are coated with the pressure-sensitive adhesive/tackifier and thus are better able to cause the particles to remain in the voids by adhesive forces, as well as by being purely mechanically trapped.

The advantage of the invention of parent application Ser. No. 07/560,477 lies in the fact that the ability of the pressure-sensitive adhesive to pick up and retain dust and particles is enhanced by a tackifier. Furthermore, rather than being applied just to the surface of the cloth, the adhesive and tackifier are impregnated throughout the cloth.

In one particular application, namely, in the finishing of automotive parts, including body parts, the standard procedure is to sand the metal prior to painting. However, the sanding leaves a layer of metallic dust that must be completely removed before painting can begin. This is accomplished by the use of cleaning cloths and it is imperative that the cloths be inexpensive, be easily and smoothly slidable across the surface of the part, yet completely effective in picking up and retaining the metal particles.

The cloth of the invention of parent application Ser. No. 07/560,477 accomplished this important task effectively and economically with good cleaning performance, but did not solve the problems associated with drying out of the tackifier during storage. It was found that the shelf life of such tack cloth was curtailed due to drying out of the tack materials.

SUMMARY OF THE INVENTION

An object of the present invention is to overcome the aforementioned shortcomings of the above-discussed tack cloth. In particular, it is an object of the present invention to provide a tack cloth having a long shelf life. This is accomplished by using tack materials that have a very low vapor pressure. Consequently, the present invention provides a wipe which may be exposed to high temperatures and to air drafts without undergoing a significant decrease in tack levels.

Another object of the invention is to provide a tack cloth having tack levels which can be controlled by the ratio and functionality of the pressure-sensitive adhesive and tackifier in the composition and by their total content in the fabric.

A further object of the invention is to deliver a tack system to a fabric via a water-based system, thereby avoiding problems associated with vapor and solvent recovery. For example, the process of delivery and application from a hydrocarbon solvent can produce irritant vapors and/or combustible vapors. Also the finished product may contain residuals from hydrocarbon solvents.

It is also an object of the invention to provide a tack cloth which has little tendency to "mark" or leave residual adhesive or tackifier material when pressed against highly polished surfaces such as glass and polished or plated metal. A related object is to provide an adhesive/tackifier system with little tendency to contaminate the user's hands or gloves with residual tack compound. The low "marking" tendency of the tack cloth in accordance with the present invention depends on incorporating the proper proportion of slip agent.

Finally, it is a further object of the invention to provide a tack cloth which uses reduced amounts of pressure-sensitive adhesive. This is achieved through the use of highly active tackifier at a reduced level.

In the present invention, these objects, as well as other objects which will be apparent from the detailed description which follows, are achieved generally by providing a cleaning cloth comprising a fibrous material which has been treated with a composition to which solid particles adhere. The composition in accordance with the invention comprises a tackifier, a pressure-sensitive adhesive and a slip agent. The tackifier is an unsaturated, low-molecular-weight resin having low vapor pressure and a molecular weight of $<30,000$; the pressure-sensitive adhesive is acrylic, styrene butadiene rubber, vinyl acetate or other suitable pressure-sensitive compounds; and the slip agent is a high-melting-point wax or a natural fatty acid ester.

In accordance with the method of manufacturing a cleaning cloth in accordance with the invention, a water-based emulsion comprising a mixture of a tackifier, a pressure-sensitive adhesive and a slip agent is formed. This emulsion is applied to the cloth to be treated and the treated cloth is then dried.

The dried tackifier/adhesive/slip agent composition forms agglomerate at the interstices of the fibers. If applied in sufficiently large doses, the composition will form a continuous coating on the fibers.

This method is not limited in its application to wet-laid nonwoven fabrics: it can also be applied to woven or knitted fabrics in a dry state. The emulsion can be applied to the fabric by rotogravure printing, saturation in a dip tub followed by nipping between pressure rolls, spraying, padding or any other conventional method known to practitioners skilled in the art of treating fabric.

Other objects, features and advantages of the present invention will be apparent when the detailed description of the preferred embodiments of the invention is considered in conjunction with the drawings.

BRIEF DESCRIPTION OF THE DRAWINGS

The preferred embodiments of the invention will be described in detail below with reference to the drawings, wherein.

DETAILED DESCRIPTION OF THE PREFERRED EMBODIMENTS

Figure 1:
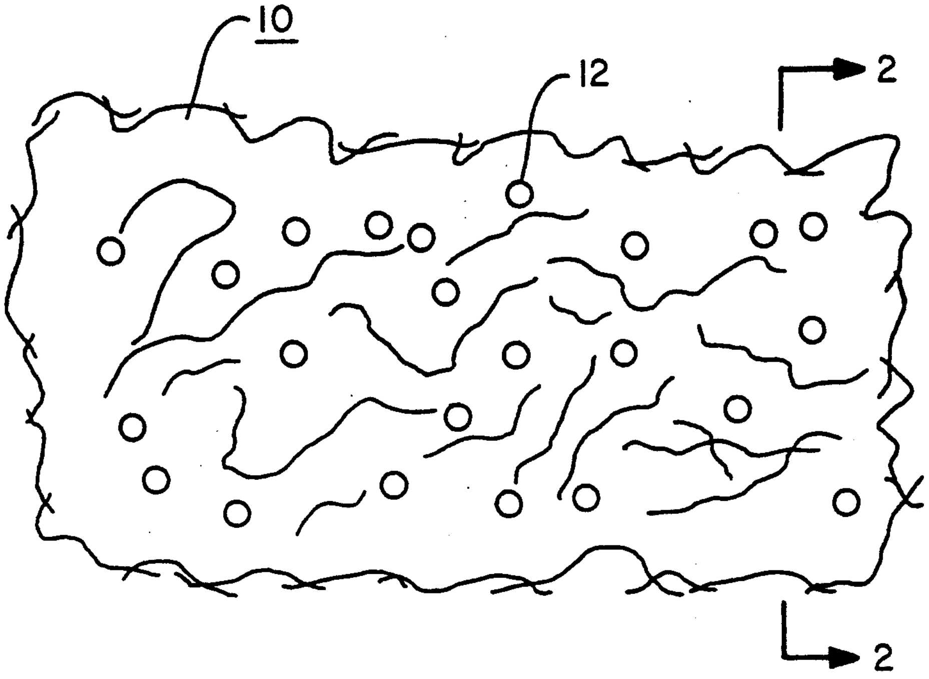
FIG. 1 is a schematic side elevation of a preferred cleaning cloth in accordance with the invention disclosed in parent application Ser. No. 07/560,477.

FIG. 1 shows generally one preferred embodiment of the invention disclosed in parent application Ser. No. 07/560,477 comprising a cloth 10 with visible apertures 12. Fabric cloth 10 comprises hydro-entangled, preferably cellulosic fibers.

Figure 2:
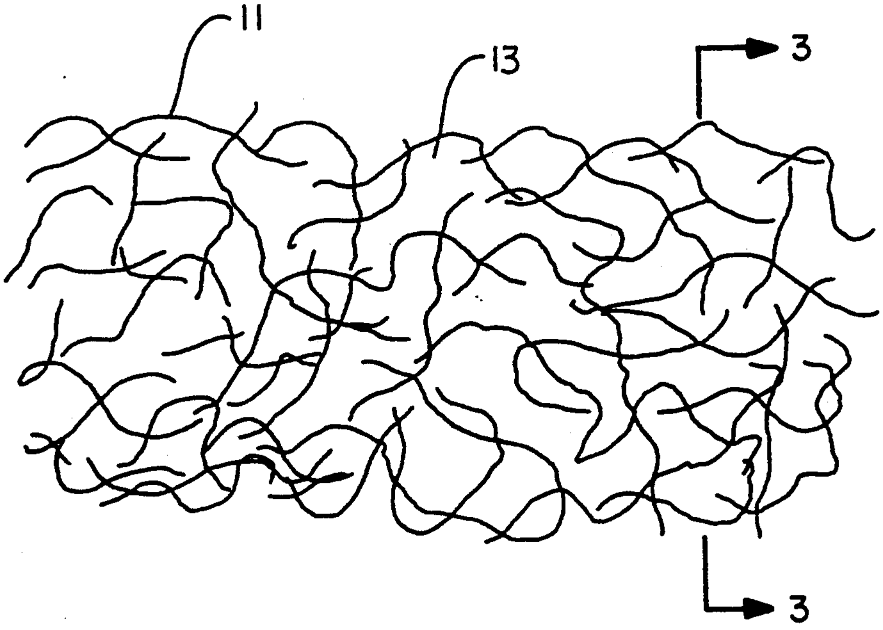
FIG. 2 is a view in section, taken along line 2—2 of FIG. 1, illustrating in schematic form the internal structure of the cloth of FIG. 1.

FIG. 2 is a sectional view and illustrates the high degree of entanglement of the fibers 11 that form cloth 10 and the voids 13 formed throughout the cloth. It should be understood that voids 13 are the small spaces between fibers, whereas apertures 12 are regularly spaced, easily visible openings formed in the cloth.

Figure 3:
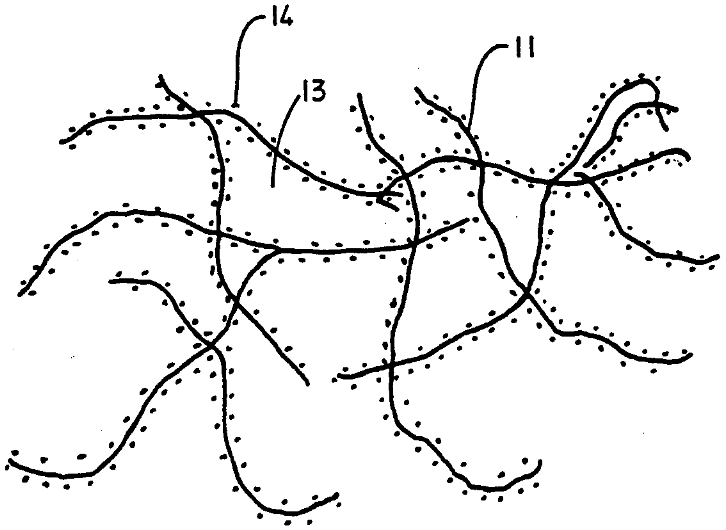
FIG. 3 is an enlarged view, taken along lines 3—3 of FIG. 2, illustrating in detail the entangled fibers and the adherence thereto of the pressure-sensitive adhesive and tackifier in accordance with the invention disclosed in parent application Ser. No. 07/560,477.

FIG. 3 is an enlarged sectional view of the entangled fibers 11 and voids 13, showing that the fibers 11 are coated with pressure-sensitive adhesive and tackifier. These substances are designated by reference numeral 14. The dots 14 are intended to depict the continuous coating formed by the adhesive and tackifier.

In the invention of parent application Ser. No. 07/560,477, the following fibers can be used alone or in blends: cellulose, rayon, cotton, polyester, polypropylene, polyethylene, nylon, acrylic and aramid fibers. The preferred cloth contained rayon to assist in the application set of the pressure-sensitive adhesive and tackifier.

The preferred pressure-sensitive adhesives in accordance with the invention of parent application Ser. No. 07/560,477 is a polyvinyl ester co-polymer made by National Starch and Chemical Corporation under the code 5540-81A, in which the ester co-polymer is mixed with water at a ratio of 56:44. This product has the following properties: boiling point—212° F., melting point—32° F., and solubility in water—100%. National Starch and Chemical Corporation sells similar grades having somewhat different physical properties, including that given National Starch and Chemical Corporation code 78-6564.

It is to be noted that, as represented by the above-discussed pressure-sensitive adhesives, it is highly desirable to use a water-based pressure-sensitive adhesive to avoid the difficulties encountered with solvent-based adhesives, including flammability and environmental problems.

A preferred tackifier for use in conjunction with the pressure-sensitive adhesive in accordance with the invention of parent application Ser. No. 07/560,477 is that made by Hercules Incorporated and designated by Hercules Incorporated as AP25-55WKX. This tackifier is described as an alkylaryl aromatic hydrocarbon resin combined with an anionic emulsifier. Other Hercules Incorporated tackifiers which have been found to be useful in connection with the invention of parent application Ser. No. 07/560,477 are: (1) Foral 85-55WKX, a glycerol ester of highly hydrogenated resin, also combined with an anionic emulsifier; and (2) Piccotex LC-55WK, an aromatic copolymer combined with an anionic resin soap.

The preferred pressure-sensitive adhesive and tackifier described above yield a preferred coefficient of friction of 1.331, which is within an ideal range of about 0.9 to about 1.5 for the coefficient of friction. That is, in lay terms, the surface of the cloth is neither too "sticky" nor too "slippery". The coefficient of friction is measured by ASTM D 1874-75 as modified for nonwovens.

Figure 4:
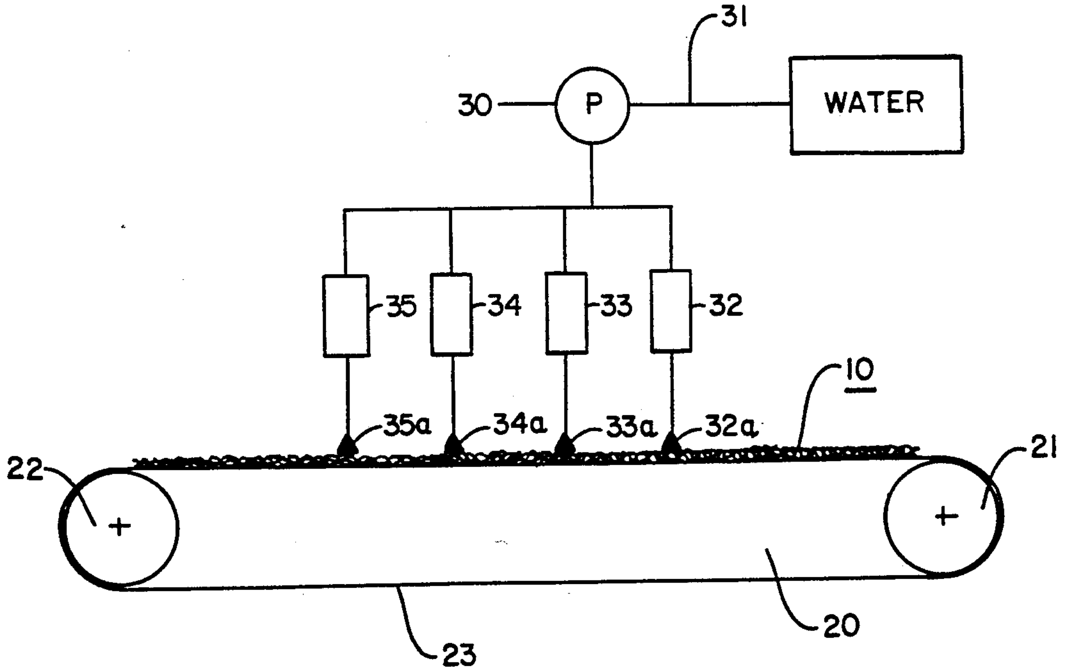
FIG. 4 is a schematic view of the apparatus used in accordance with a preferred embodiment of the method of manufacturing the cleaning cloth disclosed in parent application Ser. No. 07/560,477.

The apparatus and process for manufacturing the cleaning cloth of the invention of parent application Ser. No. 07/560,477 is schematically illustrated in FIG. 4. The apparatus comprises a set of rollers 21, 22 which support a conveyor belt 23. The fibers 10 are laid on the belt 23 by conventional means and are subjected to jets or columnar streams of high-pressure water to produce hydro-entanglement. The water pipe 31 supplies water to a high pressure pump 30 which forces the water under high pressure to filters 32–35 and then through pipes to distribution jets **32*a*–35*a***, which may be in the form of manifolds.

The entangled web, while it is still wet, is thoroughly impregnated with the pressure-sensitive adhesive and tackifier to create the unique cleaning cloth schematically illustrated in FIGS. 1–3.

To impregnate the entangled web with pressure-sensitive adhesives and tackifiers, it is preferred to do so by passing hydro-entangled fabric 10 through a metered application which controls the amount applied and surface applied to. The applications of pressure-sensitive adhesives and tackifiers are not limited to gravure, spray, or screen coaters. The wet hydro-entangled fabric assists in wicking the pressure-sensitive adhesives and tackifiers throughout the entire cloth. This method produces a cloth with a controlled amount of pressure-sensitive adhesive and tackifier that is not stiff.

In accordance with the improvement of the present invention, an advantageous cleaning cloth for removing solid particles from a solid surface can be produced by treating a fibrous material with an improved composition which is water-based, not solvent-based. The fibrous material is not limited to nonwoven fabrics, and specifically encompasses woven and knitted fabrics.

The composition in accordance with the present invention comprises a tackifier, a pressure-sensitive adhesive and a slip agent. The tackifier is 45–77 wt. %, the pressure-sensitive adhesive is 20–40 wt. % and the slip agent is 3–15 wt. % of the composition. Other ingredients, such an antifoam agent and a Ph control, can also be incorporated in the composition.

In accordance with the invention, the tackifier is an unsaturated, low-molecular-weight, non-film-forming resin with low vapor pressure having 4 to 8 carbons and a molecular weight of $<30,000$. These high-tack tackifiers provide quick adhesion to the contaminant particles to be picked up from the surface to be wiped, remove the contaminant particles from the solid surface and maintain them adhered so that the particles do not fall back onto the surface. These tackifiers have low peel adhesion to solid surfaces so that tackifier material will not be transferred to the surface being cleaned, yet sufficient and controlled adhesion to attach and retain the contaminant particles. The low external adhesion of these tackifiers also prevents "blocking" or adherence between layers of the wipe material when wound in rolls. This low adhesion property is also intended to allow cutting, folding, stacking and separation in packaging of the finished wipes. Further the low peel adhesion of these tackifiers prevents tackifier material from contaminating or releasing into the user's hand. Lastly, the very low vapor pressure of the tackifiers used in accordance with the invention allows the finished wipes to remain in storage for long durations without the loss of tack due to drying out of the tackifier material.

In accordance with the preferred embodiments, the tackifier is polybutene, polyisobutylene, polyhexene or an unsaturated alkyl. The tackifier is applied in the form of a water-based emulsion containing suitable emulsifiers to make the polymer emulsifiable in the water phase. The preferred tackifier is a polybutene. Preferably the polybutene is applied in the form of a water-based emulsion marketed under the trade name MICHEM™ Emulsion 35160, which is commercially available from Michelman, Inc., 9089 Shell Road, Cincinnati, Ohio.

MICHEM™ Emulsion 35160 is an anionic emulsion containing polybutene in an amount equal to 59.0–61.0% total solids. This emulsion is a semi-viscous liquid having a creamy white appearance and a viscosity of 200–600 cps measured on a Brookfield LVT viscometer using the #3 spindle at 60 rpm. The only volatile component in the emulsion is water. The pH of the emulsion is 9.0–10.5.

In accordance with the preferred embodiments of the invention, the pressure-sensitive adhesive is acrylic, styrene butadiene rubber, vinyl acetate or other suitable pressure-sensitive compounds. The pressure-sensitive adhesive serves both as a cohesive element, i.e., the adhesive anchors the system to the fabric and prevents the tackifier from transferring to the surfaces which it contacts, and as an adhesive element, i.e., the adhesive provides sites of tackiness for holding additional dust an contaminant particles. The pressure-sensitive adhesive may be any polymer or co-polymer having a low glass transition temperature, high internal cohesion and medium external peel adhesion.

The preferred pressure-sensitive adhesive is acrylic. Preferably the acrylic is applied in the form of a water-based emulsion marketed under the trade name Carbotac TM XPD-1811, which is commercially available from The B.F. Goodrich Company, Specialty Polymers & Chemicals Division, 9911 Brecksville Road, Cleveland, Ohio 44141-3247. Another pressure-sensitive adhesive which can be used is Carbotac TM XPD-1822.

Carbotac TM XPD-1811 is an acrylic emulsion for pressure-sensitive adhesives. Tack and peel properties for this polymer are very high, with moderate shear properties. Carbotac TM XPD-1811 acrylic emulsion has good heat and light stability, good sprayability, a moderate viscosity increase with increasing Ph and good external cross-linkability through carboxyl sites. In particular, Carbotac TM XPD-1811 acrylic emulsion has the following typical properties: a glass transition temperature of −43° C; total solids of 55%; Ph=7.0; a viscosity of 130 cps measured on a Brookfield LVF viscometer using the #2 spindle at 60 rpm; and a density of 8.7 lbs./gal. Carbotac TM XPD-1811 has the following typical adhesive properties: finger tack—high; loop test—4000 g/in.$^2$; rolling ball test—1.5 in.; Polyken test—800 g/cm$^2$; peel adhesion (14 WWR)—1400 g/linear in. (cohesive failure); peel adhesion (40 WWR)—1880 g/linear in. (cohesive failure). Carbotac TM XPD-1822 has greater viscosity, less tack and less peel adhesion than Carbotac TM XPD-1811.

Further, in accordance with the invention, the slip agent can be water emulsions of natural or synthetic high-melting-point waxes or of a natural fatty acid ester. In particular, the slip agent can be oleamide, euracamide, stearamide or ammonium stearate. The slip agent incorporated in the composition in accordance with the invention serves to prevent adhesion and blocking between layers of fabric or layers of converted wipes. The slip agent has an inhibiting effect on the tackifier, but without blocking the tackifier's ability to adhere contaminant particles, such as dirt and powder solids, thereto.

The preferred slip agent is ammonium stearate. Preferably the ammonium stearate used is that which is commercially available from Davco Specialty Products, Inc., 100 Dallas Avenue, P.O. Box 9144, Warwick, R.I. 02889. Davco ammonium stearate is a white, pearlescent viscous liquid used as a frothing aid and foam stabilizer in acrylic and SBR latex systems and has the following typical properties: active solids—33%; pH (2% solution)—10.0±1.0. Ammonium stearate disperses readily in water; is stable in normal storage; and is unstable above 100° F.

In addition, ammonium hydroxide may be added to the composition to control pH. An antifoaming agent which reduces surface tension may also be added to suppress the formation of foam in the bath. Any conventional non-silicon-based antifoaming agent, including that marketed under the trade name Atfm 97.

In accordance with one specific formulation of the invention, the water-based emulsion has the following composition:

| Component | Dry Content (%) |
|---|---|
| 35160 Tackifier | 71.5 |
| Carbotac XPD-1811 | 21.5 |
| Ammonium Stearate | 5.7 |
| Antifoaming Agent | 1.3 |

This water-based emulsion was applied to fabric by padding and then squeezing. For this specific formulation, the percentage of composition mixture in the fabric was 28%. However, in accordance with the invention the amount of the tackifier/adhesive/slip agent composition applied to the fabric may vary between 3% for a low-activity tack cloth and 50% for a high-activity tack cloth based on dry fabric weight.

Figure 5:
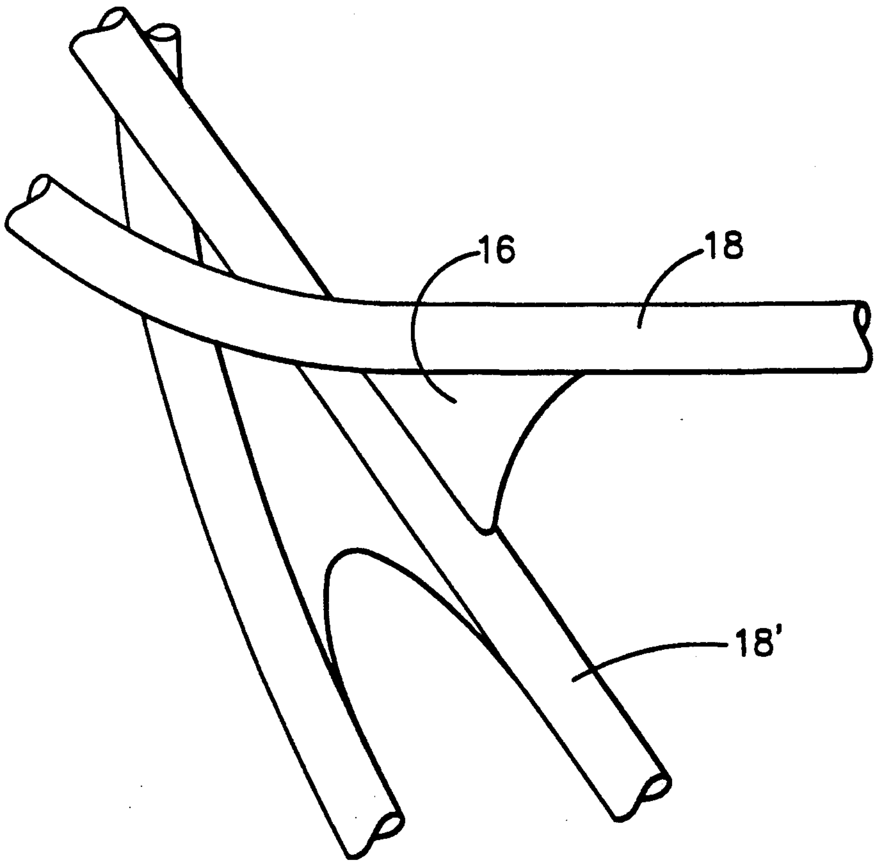
FIG. 5 is a diagrammatic view of an agglomerate of tackifier/adhesive/slip agent adhered to a fiber interstice of the type occurring in the tack cloth in accordance with the present invention.

In accordance with the method of manufacturing a cleaning cloth in accordance with the invention, a water-based emulsion comprising a mixture of a tackifier, a pressure-sensitive adhesive and a slip agent is formed. This emulsion is applied to the cloth to be treated and the treated cloth is then dried. The tackifier, adhesive and slip agent meld together to form agglomerates at fiber interstices. Such an agglomerate 16 of the tackifier/adhesive/slip agent composition, adhered to adjacent fibers 18 and 18' and bridging the interstice therebetween, is depicted diagrammatically in FIG. 5. Alternatively, if the tackifier/adhesive/slip agent composition is applied in sufficient quantities, the dried emulsion will form a continuous coating on the fibers.

In accordance with the invention, the fabric base material can be any nonwoven, woven or knitted array of polyester, rayon, acetate, acrylic, polypropylene, cotton, wool or wood fibers or blends thereof.

The first step in manufacturing the tack cloth in accordance with the invention is to combine the tackifier, adhesive and slip agent water-based emulsions to form a single homogeneous batch. If desired, an antifoaming agent and a pH control can be added to the mixture. After the composition is sufficiently mixed, it can be applied to the woven, nonwoven or knitted fabric by any conventional means. The emulsion can be applied to the fabric by rotogravure printing, saturation in a dip tub followed by nipping between pressure rolls, spraying, padding or any other conventional method known to practitioners skilled in the art of treating fabric. This method is not limited in its application to wet-laid nonwoven fabrics: it can also be applied to woven or knitted fabrics in a dry state.

Although the invention has been described with reference to preferred embodiments, it will be appreciated that components different than but functionally equivalent to the specific tackifiers, adhesives and slip agents disclosed herein could be used to achieve the same results. Such functionally equivalent ingredients are well known to those skilled in the pertinent arts. All such variations and modifications are intended to be within the scope and spirit of the invention as defined in the claims appended hereto.

We claim:

1. A cleaning cloth for removing particles from a surface, comprising a material made of fibers and a composition applied to said fibers, said composition comprising a tackifier, a pressure-sensitive adhesive and a slip agent.

2. The cleaning cloth as recited in claim 1, wherein said tackifier is an unsaturated, low-molecular-weight resin having low vapor pressure and a molecular weight of <30,000.

3. The cleaning cloth as recited in claim 2, wherein said tackifier comprises polybutene.

4. The cleaning cloth as recited in claim 2, wherein said tackifier comprises polyisobutylene.

5. The cleaning cloth as recited in claim 2, wherein said tackifier comprises polyhexene.

6. The cleaning cloth as recited in claim 2, wherein said tackifier comprises an unsaturated alkyl.

7. The cleaning cloth as recited in claim 1, wherein said pressure-sensitive adhesive comprises acrylic.

8. The cleaning cloth as recited in claim 1, wherein said pressure-sensitive adhesive comprises styrene butadiene rubber.

9. The cleaning cloth as recited in claim 1, wherein said pressure-sensitive adhesive comprises vinyl acetate.

10. The cleaning cloth as recited in claim 1, wherein said slip agent comprises a high-melting-point wax.

11. The cleaning cloth as recited in claim 1, wherein said slip agent comprises a natural fatty acid ester.

12. The cleaning cloth as recited in claim 11, wherein said slip agent comprises oleamide.

13. The cleaning cloth as recited in claim 11, wherein said slip agent comprises euracamide.

14. The cleaning cloth as recited in claim 11, wherein said slip agent comprises stearamide.

15. The cleaning cloth as recited in claim 11, wherein said slip agent comprises ammonium stearate.

16. The cleaning cloth as recited in claim 1, wherein said tackifier comprises 45–77 wt. % of said composition, said pressure-sensitive adhesive comprises 20–40 wt. % of said composition and said slip agent comprises 3–15 wt. % of said composition.

17. A cleaning cloth for removing particles from a surface, comprising a material made of fibers and a composition applied to said fibers, said composition comprising a tackifier and a pressure-sensitive adhesive, said tackifier being an unsaturated, low-molecular-weight resin having low vapor pressure and a molecular weight of <30,000.

18. The cleaning cloth as recited in claim 17, wherein said tackifier is selected from the group consisting of polybutene, polyisobutylene, polyhexene and unsaturated alkyls.

19. The cleaning cloth as recited in claim 17, further comprising a slip agent selected from the group consisting of high-melting-point waxes and natural fatty acid esters.

20. A method of manufacturing a cleaning cloth for removing particles from a surface, comprising the following steps:

forming a water-based emulsion comprising a mixture of a tackifier, a pressure-sensitive adhesive and a slip agent;

applying said water-based emulsion to cloth; and drying said treated cloth.

21. The method of manufacturing a cleaning cloth as recited in claim 20, wherein said tackifier is an unsaturated, low-molecular-weight resin having low vapor pressure and a molecular weight of <30,000.

22. The method of manufacturing a cleaning cloth as recited in claim 21, wherein said tackifier is selected from the group consisting of polybutene, polyisobutylene, polyhexene and unsaturated alkyls.

23. The method of manufacturing a cleaning cloth as recited in claim 21, further comprising a slip agent selected from the group consisting of high-melting-point waxes and natural fatty acid esters.

* * * * *